United States Patent Office 3,364,670
Patented Jan. 23, 1968

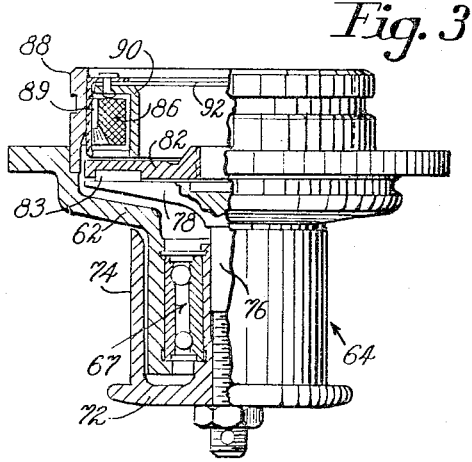
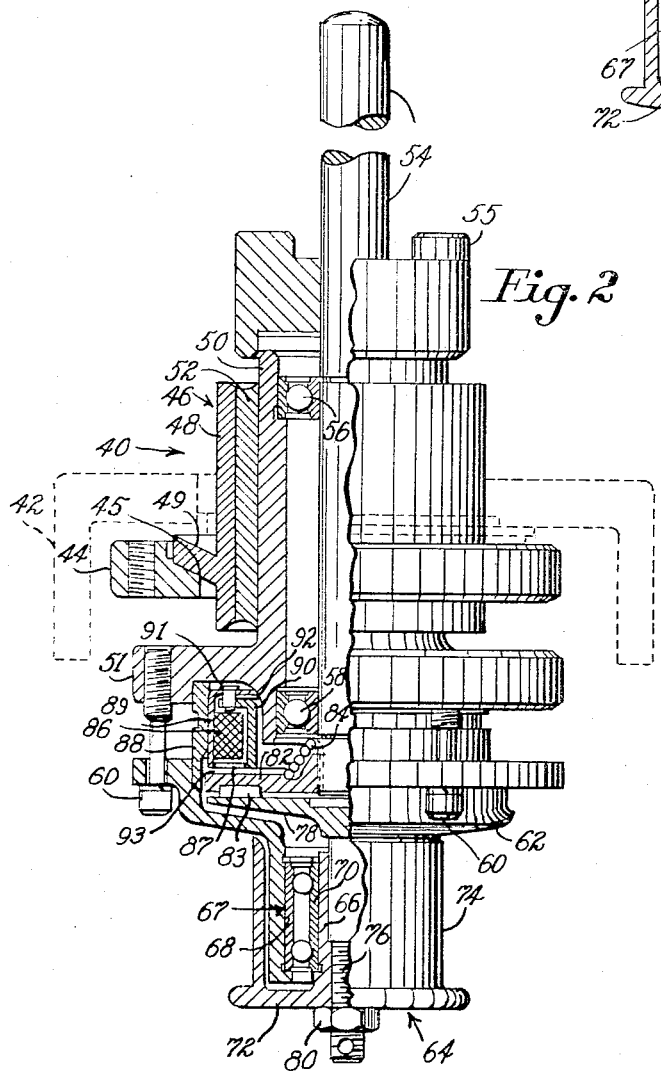

3,364,670
SPINDLE CONTROL MECHANISM
Erhard E. Stiepel and John D. Page, Clemson, and Philip A. Bowie, Pendleton, S.C., assignors to Maremont Corporation, Chicago, Ill., a corporation of Illinois
Filed Feb. 24, 1966, Ser. No. 529,881
7 Claims. (Cl. 57—88)

This invention generally relates to a mechanim for control of a twister spindle and more particularly to a novel control mechanism including clutch and brake means for automatically driving and stopping the spind'e upon detection of an absence of a yarn being wound thereon.

It is customary to drive several spindles from a common power source, however, such an arrangement raises a problem when it is desired to stop a particular spindle without affecting the operation of others. Such a problem arises whenever a break, run out, or excessive slack is detected in one or more of a plurality of yarns being delivered from a source of supply and being plied together prior to being wound into a package on the spindle. When such a problem arises, is is desirable to be able to stop the rotation of the spindle while permitting the remaining spindles to continue normal operation.

Heretofore various arrangements have been derived which permit stoppage of an individual spindle and at the same time permit continued operation of the remaining spindles, however, these prior arrangements have proven undesirable for various reasons, especially, since they have been quite difficult to maintain because of their complexity and the life expectancy of the bearings employed in combination with the whorl was generally quite short due primarily to fretting, resulting from sudden changes in the operation of the bearing because of spindle stoppage. More specifically, the inner and outer races of these bearings have normally been positioned between the whorl and spindle blade and thus rotate together as a unit during winding operation of the spindle. This is undesirable as there should be relative movement between the races during spindle operation for the bearing to function properly. Additionaly, upon stopping the spindle, although relative movement between the races is temporarily achieved since the inner race is stopped along with the spindle blade while the outer race continues to rotate with the whorl, it has been found that damage to the bearing still results because of the sudden change in such operation.

It is therefore a primary object of the invention to provide a novel spindle mechanism in which the life expectancy of the bearing operated by the whorl is substantially increased by providing for unchanged operation of the bearing during both normal operation of the spindle as well as during intervals in which the winding operation of the spind'e is stopped.

It is also a primary object of this invention to overcome the above maintenance difficulties by providing a novel spindle mechanism that is easy to maintain in which the major components of the mechanism are comprised in a sub-assembly which is adapted to be easily removed as a separate independent unit.

It is another object of the invention to provide a novel spindle mechanism in which the whorl is spaced below and operates independently of the spindle blade.

It is a further object of the invention to provide a novel spindle employing an electro-magnet coil to automatically disengage the spindle from its drive in which an arrangement is provided for easily adjusting the air gap between the spaced braking surfaces when the spindle is in normal winding operation.

Generally, the invention includes a spindle blade rotatably mounted in a housing which housing is mounted in a spindle rail of a twisting frame in a conventional manner. A continuously driven whorl having a hub portion mounted in the inner race of a bearing below the lower end of the spindle blade drives through a clutch mechanism to operate the spindle blade as a unit. The driven side of the clutch mechanism is normally engaged with the driving side which is in turn continuously driven from the whorl, however, upon an indication of an absence of a yarn, an electro-magnetic coil is energized thereby magnetica'ly attracting the driven side of said clutch and moving the same into engagement with a braking surface on the coil thereby interrupting the drive to the spindle blade and stopping rotation of the same.

The foregoing and other objects and advantages of the invention will become more readily apparent from the following detailed description of a preferred form thereof taken in conjunction with the accompanying drawing in which:

FIG. 2 is an enlarged sectional detail of the spindle mechanism along the lines 2—2 of FIG. 1; and FIG. 3 is a sectional detail of the sub-assembly.

Figure 1:
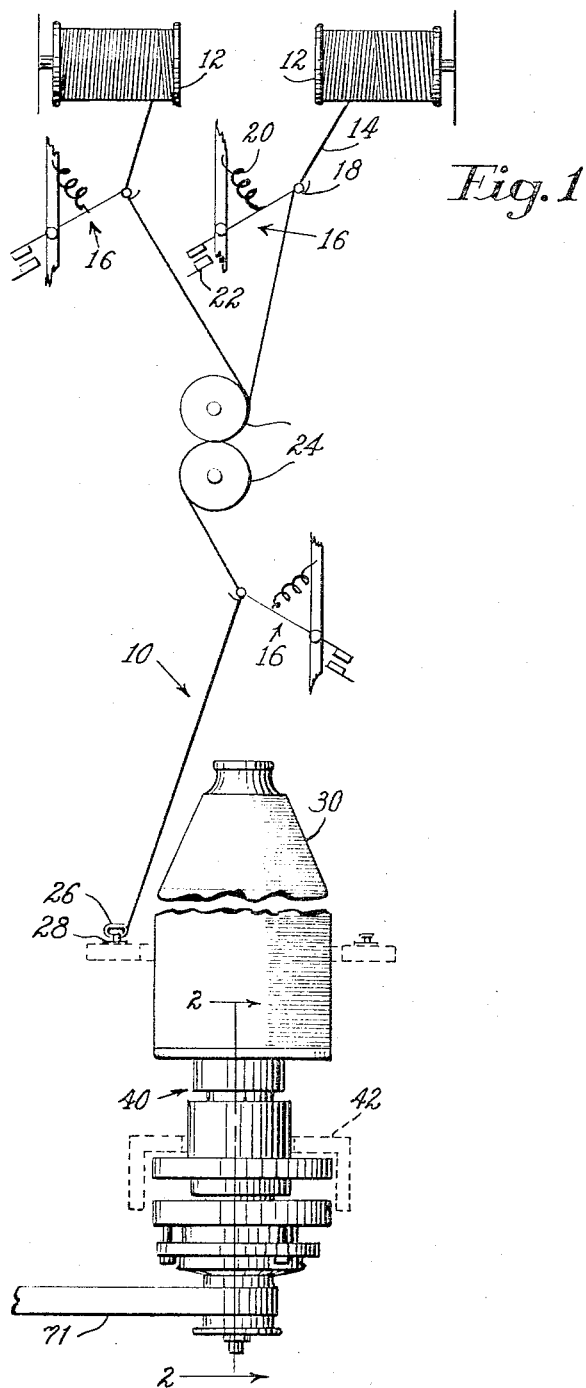
FIG. 1 is a view of the thread winding apparatus embodying the invention.

Referring now to the drawings and more particularly to FIGS. 1 and 2 it will be seen that the numeral 10 generaly indicates the invention wherein are schematically illustrated a plurality of yarn packages 12 each having a strand of yarn 14 led therefrom through a detecting device indicated generally at 16. The detecting device is comprised of a pivotally mounted yarn guide 18 retained in proper position by the tension exerted by the yarn during winding. Upon an undesirable variation in the yarn tension or whenever the yarn breaks or runs out the yarn guide 18 is actuated by a spring 20 into engagement with an electrical contact 22 in order to close an electrical circuit and energize an electro-magnetic coil in the spindle which will be more fully described hereafter.

Subsequent to passing through the detecting devices 16 the several yarn strands to be plied together are passed through the piecing rolls 24 of the twister frame at which time the strands are plied together into a single yarn which yarn is again passed through another detecting device 16 and thence through a traveler 26 running on ring 28 of the twister frame and onto the rotating bobbin 30. It should be understood that any number of yarn strands and that any suitab'e conventional detecting means may be employed which will be clear to those having skill in the art.

Turning now to the spindle mechanism illustrated generally at 40, it will be seen in FIG. 2 that the spindle is mounted in a spindle rail 42 (shown in dotted lines) by a conventional spindle mount including a locking ring 44 having an annular seat 45 secured to the under surface of the spindle rail in which is adjustably positioned a spindle mounting assembly 46 comprised of an outer sleeve 48 which is adjustably positioned in the annular seat 45 by means of lugs 49, and inner sleeve 50 having an outwardly extending flange 51 and an intermediate sleeve 52 comprised of a resilient material mounted therebetween which is intended to absorb shock and vibration of the spindle unit during operation. Positioned within the inner sleeve of the spindle mounting assembly is a spindle blade 54 having the usual lugs 55 for engaging and rotating the yarn package which is rotatably mounted by upper and lower bearings 56, 58, respectively, located between the inner wall of the inner sleeve and the spindle blade. Attached to the lower flange 51 of the inner sleeve 50 by suitable means such as screws 60 is a stationary housing 62 in which a whorl 64 is rotatably mounted. The whorl is comprised of an inner hub portion 66 extending within the housing 62 and mounted for free rotational movement therein by means of a bearing 67 having an outer race 68 fixed to the inner wall of the stationary housing 62 and an inner race 70 fixed to and rotating with the inner hub 66 of the whorl. The whorl is driven by a suitable continuously running driving band 71 as will be understood by those skilled in the art. The whorl 64 further includes a lower flange portion 72 having a circumferential driving surface 74 which is coaxial with the hub portion 66 and surrounds the fixed housing 62. Fixed within the inner hub portion 66 and continuously driven thereby is a whorl shaft 76 on the upper end of which is fixedly mounted a driving clutch disc 78. The whorl shaft 76 is adjustably positioned within the inner hub portion in a suitable manner, as for example, by means of screw threads and a lock nut 80 for reasons which will be more fully set forth below.

Adjacent the driving clutch disc 78 is a driven disc 82 comprised of a ferromagnetic material which is rotatably fixed to the spindle blade 54 as by a splined connection whereby the driven disc 82 it is permitted to move a short distance along the longitudinal axis of the spindle blade. Fixed to the lower surface of the driven disc is a suitable friction material 83 which normally engages the continuously rotating driving disc 78 in order to impart rotational movement to the driven disc. The driven disc is normally maintained in engagement with the driving disc 78 by a conical spring 84 interposed between the bearing 58 and the upper surface of the driven disc thereby exerting a downward force on the disc in order to insure engagement with the driving disc 78. Adjacent the upper surface of the driven disc 82 but slightly spaced thereabove is a conventional electro-magnetic coil 86, the underside of which is provided with a suitable braking surface 87 for engagement with the upper surface with the driven disc 82 whenever the disc is pulled upwardly by the magnetic forces of the coil at the time it becomes energized. Surrounding the electro-magnetic coil 86 is a spacer 88 whose vertical dimensions provide for a proper setting of the housing 62 to the flange 51. The coil 86 includes the usual pole pieces 89, 90 to transmit the magnetic flux generated by the coil so as to attract the ferromagnetic clutch disc 82. The pole pieces are attached to the coil by a suitable means such as pin 91 and are spaced from each other at 92 in order to speed the decay of the magnetic forces when the coil is deenergized.

As mentioned earlier, a suitable space or air gap 93 is provided between the upper surface of the driven disc 82 and the brake surface 87 on the underside of the coil 86. The air gap is important since a variation in the distance between these two surfaces determines the amount of time required in completely stopping the rotation of the spindle blade. A simple and convenient means of varying the air gap is provided for by merely rotating the whorl shaft 76 with respect to the inner hub portion 66 of the whorl in order to move the whorl shaft and its related driving disc 78 in an axial direction either toward or away from the break surface 87 as desired.

The housing 62 and the spacer 88, fixed thereto as by means of a press fit, form a composite housing for the sub-assembly illustrated in FIG. 3 which may be removed in its entirety from the spindle blade and its associated spindle mounting assembly 46 without interfering with the alignment of the spindle. The principal elements of the sub-assembly in the recommended form shown in FIG. 3 are the composite housing; whorl 64; bearing 67; whorl shaft 76; clutch discs 78, 82; and electro-magnetic coil 86. In the prior art spindles of this type of which we are aware, removal of the principal elements of the spindle as a complete sub-assembly has not been possible. Thus, whenever such a spindle did not operate properly the entire unit had to be removed from the spindle rail for repair requiring that the difficult and time consuming operation of installing and aligning the spindle be repeated upon re-installation of the unit thereby considerably increasing the production loss for the spindle. This improvement forms an important aspect of the present invention.

In normal operation, the clutch discs 78, 82 are engaged and the electro-magnetic coil 86 is de-energized permitting the rotational drive from the continuously driven whorl to be transmitted to the spindle blade 54 and the yarn package 30 mounted thereon. However, when a strand of yarn either breaks or runs out or when an excessive amount of variation occurs in the tension exerted on the yarn being processed, the detecting device 16 is actuated to a closed position by the spring 20, completing the electrical circuit to the electro-magnetic coil 86 and energizing the latter. Upon being energized, the coil attracts the driven clutch disc 82 and lifts the same upwardly against the action of spring 84 into engagement with the brake surface 87 which disengages the drive to the spindle blade and immediately stops rotation of the disc, spindle blade and yarn package in order to insure that no defective yarn is wound onto the package. During the period in which the spindle is stopped, the whorl 64, whorl shaft 76 and driving clutch disc 78 continue to operate in their usual manner.

It should be noted that by locating the whorl below the lower end of the spindle blade the present invention insures continuous unchanged operation of the bearing 67 in which there is always constant relative rotation between the respective races irregardless of whether the spindle is operating normally or is stopped. Thus, as pointed out earlier, it will be seen that the invention overcomes a problem that has long been present in prior spindles of this type by eliminating excessive wear and damage to the bearing by suddenly changing its mode of operation upon stopping and starting of the spindle.

Having described the preferred embodiment of the invention, it is understood that other constructions and configurations, obvious to those skilled in the art are incorporated within the spirit of the invention as defined in the appended claims.

What is claimed is:

1. A spindle mechanism comprising
   a housing,
   a spindle blade rotatably supported in the upper portion of said housing,
   a driving whorl having a hub portion rotatably supported by the lower portion of said housing below the lower end of said spindle blade,
   clutch means including a driving member continuously operated by said whorl and a driven member connected to said spindle blade movable into and out of engagement with said driving member,
   means normally engaging said driven member with said driving member whereby said spindle blade is driven as a unit therewith,
   brake means in opposed spaced relation to said driven member, and
   means operable to disengage said driven member from said driving member and to engage the same with said brake means whereby rotation of said spindle blade is stopped.

2. A spindle mechanism as claimed in claim 1 and further including means for varying the air gap between said driven member and said brake means.

3. A spindle mechanism as claimed in claim 1, wherein said disengaging means includes an electro-magnetic device and detecting means for energizing said device upon detection of an unwanted variation in a yarn being wound on said spindle.

4. A spindle mechanism comprising
   a stationary housing,
   a spindle blade rotatably supported in the upper portion of said housing, a bearing member having an outer race and an inner race, one of said races being fixed to a wall of the lower portion of said housing below the lower end of said spindle blade, a continuously driven whorl fixed to the other of said races, a clutch means including a driving member operated by said whorl and a driven member connected to said spindle blade movable into and out of engagement with said driving member, means normally engaging said driven member with said driving member whereby said spindle blade is driven as a unit therewith, brake means in opposed spaced relation to said driven member, and means operable to disengage said driven member from said driving member and to engage the same with said brake means whereby rotation of said spindle blade is stopped.

5. A spindle mechanism as claimed in claim 4 wherein the outer race of said bearing member is fixed to the inner wall of said stationary housing and the inner race is fixed to the whorl.

6. A spindle mechanism comprising
an upper housing,
a spindle blade rotatably supported in the upper portion of said housing,
a lower housing,
a driving whorl rotatably supported by said lower housing below the lower end of said spindle blade,
clutch means including a driving member operated by said whorl and a driven member connected to said spindle blade movable into and out of engagement with said driving member, means normally engaging said driven member with said driving member whereby said spindle blade is driven as a unit therewith, brake means in opposed spaced relation to said driven member, and means operable to disengage said driven member from said driving member and to engage the same with said brake means whereby rotation of said spindle blade is stopped, said whorl, clutch means and disengaging means being positioned in said lower housing and comprising a sub-assembly adapted to be removed as a unit from said spindle mechanism.

7. A spindle mechanism as claimed in claim 6 further including a bearing member having an outer race and an inner race, one of said races being fixed to said lower housing and the other of said races rotatably supporting said whorl.

References Cited
UNITED STATES PATENTS

| | | | |
|---|---|---|---|
| 2,666,289 | 1/1954 | Bunch | 57—88 XR |
| 2,803,106 | 8/1957 | Lindemann et al. | 57—88 |
| 2,972,219 | 2/1961 | Collins | 57—88 |
| 2,975,584 | 3/1961 | Makant et al. | 57—88 |
| 3,089,573 | 5/1963 | Walker | 192—18 |

JOHN PETRAKES, *Primary Examiner.*